United States Patent [19]

Hsieh et al.

[11] Patent Number: 5,710,550
[45] Date of Patent: Jan. 20, 1998

[54] APPARATUS FOR PROGRAMMABLE SIGNAL SWITCHING

[75] Inventors: Wen-Jai Hsieh; Chi-Song Horng; Chun Chiu Daniel Wong, all of Palo Alto; Gerchih Chou, San Jose; Shrikant Sathe, Saratoga, all of Calif.

[73] Assignee: I-Cube, Inc., Campbell, Calif.

[21] Appl. No.: 516,322

[22] Filed: Aug. 17, 1995

[51] Int. Cl.$^6$ ............................................. H03K 17/0412
[52] U.S. Cl. ........................ 340/825.79; 340/825.87; 370/423; 370/429; 326/41; 326/38
[58] Field of Search .................. 340/825.79, 825.87; 370/422, 423, 428, 429; 395/309, 250, 280, 311, 872; 326/41, 38; 364/239

[56] References Cited

U.S. PATENT DOCUMENTS

| | | | |
|---|---|---|---|
| 5,282,271 | 1/1994 | Hieh et al. | 395/872 |
| 5,319,261 | 6/1994 | Srinivasan et al. | 326/41 |
| 5,359,592 | 10/1994 | Corbalis et al. | 370/422 X |
| 5,406,138 | 4/1995 | Srinivasan et al. | 326/41 |
| 5,428,750 | 6/1995 | Hsieh et al. | 395/309 |
| 5,428,800 | 6/1995 | Hsieh et al. | 395/310 |
| 5,465,056 | 11/1995 | Hsieh et al. | 340/825.87 X |

*Primary Examiner*—Michael Horabik
*Assistant Examiner*—William H. Wilson, Jr.
*Attorney, Agent, or Firm*—Smith-Hill and Bedell

[57] ABSTRACT

A field programmable interconnect device (FPID) selectively routes signals between signal ports in response to commands from a host controller. Each command includes an address and data. The FPID includes an array of switch cells, each interconnecting a separate pair of the ports and each having first and second control signal inputs. When the first and second control signals are both asserted, the switch cell provides a signal path between the pair of the ports it interconnects. The FPID includes first and second sets of memory cells for storing data. Each first memory cell corresponds to a separate one of the switch cells and selectively asserts or deasserts the first control signal input to the corresponding switch cell according to its stored data. Each second memory cell corresponds to a separate group of switch cells and selectively asserts or deasserts the second control signal input to each switch cell of the corresponding group according to its stored data. The FPID further includes a memory controller for receiving each command from the host controller and for writing data included in the command into each memory cell of a particular subset of the first and second memory cells upon receipt of the command. The address included in the command indicates the particular subset into which the controller is to write the data. The number of memory cells included in the particular subset is a variable function of the address.

18 Claims, 4 Drawing Sheets

APPARATUS FOR PROGRAMMABLE SIGNAL SWITCHING

BACKGROUND OF THE INVENTION

1. Field of the Invention

The present invention relates in general to a field programmable switching and interconnect device for switching parallel buses.

2. Description of Related Art

Many electronic systems employ field programmable gate arrays (FPGAs), such as those manufactured by Xilinx Inc., to selectively reconfigure system component interconnections for various modes of system operation. A typical FPGA includes several input and output ports and a network of logic gates interconnecting the input and output ports. The FPGA also includes a number of memory cells that store data received from an external source such as a computer. The data in the memory cells control switching states of various gates in the FPGA. By loading data into the memory cells, the computer configures (i.e. "programs") the FPGA for generating an output signal at any given port that is a selected logical combination of states of input signals at one or more of the input ports. An FPGA may be used for selectively routing signals between system components and may also be used to perform various logic operations on the signals being routed.

While programmable FPGAs are useful, they have limitations. All input/output signals must be unidirectional and all signals must be of the same logic circuit type, such as TTL or CMOS. Thus, the FPGAs cannot directly interconnect bidirectional signal sources and cannot interface differing types of devices such as TTL and CMOS devices. In addition, the attributes of the I/O ports of an FPGA cannot be varied, nor can they be dynamically configured without loss of data integrity.

On the other hand a field programmable interconnect device (FPID) flexibly routes unidirectional as well as bidirectional signals between a electronic components. An FPID is taught in U.S. Pat. No. 5,282,271 titled I/O BUFFERING SYSTEM TO A PROGRAMMABLE SWITCHING APPARATUS issued Jan. 25, 1994 to Wen-Jai Hsieh et al. The described FPID includes an array of switch cells, each switch cell including a crosspoint switch and a single-bit memory. For example, a 64 port FPID has 64 rows of switch cells with up to 64 cells per row. The crosspoint switch of each switch cell selectively interconnects two I/O ports. The data bit stored in the memory of each cell controls the state of the crosspoint switch. By changing the state of the bit stored in the memory of a particular cell, a user can make or break a connection between two particular I/O ports.

The memory cells of the FPID are programmed on a row-by-row basis through data arriving on a serial IEEE standard 1149.1 "JTAG" bus. The JTAG bus carries data between the FPID and a host controller and permits the host controller to write bits to the memory of each cell of the FPID on a row-by-row basis so as to make the desired connections. In order to program a row of crosspoint switches the host controller serially transmits 64 bits of programming data to the FPID via the JTAG bus, one bit for each cell of the row, along with several control bits and bits indicating a row address. The host controller may want to change only a single bit stored in the memory of one crosspoint array cell, thereby to make or break a single connection between two specific FPID I/O ports. But to do so, the host controller must sent data not just to the cell of interest, but to all 64 cells of the row containing the cell of interest. Thus in a prior art FPID, making or breaking a single connection between two FPID I/O ports requires a substantial number of clock cycles on the serial JTAG bus.

Since so many JTAG bus clock cycles are required to alter the programming of an FPID, FPIDs are not used in applications where high switching speed is important. For example a prior art FPID could be used for switching the parallel I/O bus of a computer processor between buses of selected peripheral devices. But to switch from one bus to another, the contents of a large number of FPID memory cells must be altered. The time required to write data to so many memory cells makes the FPID too slow for many bus switching applications.

What is needed is an improved FPID whose switching patterns can be rapidly altered with minimal input data and which can switch between buses with minimal programming delay.

SUMMARY OF THE INVENTION

A field programmable interconnect device (FPID) in accordance with the present invention selectively routes signals between signal ports in response to commands from a host controller. Each command is conveyed to the FPID in the form of a parallel word conveyed on a parallel bus and each command includes data and an address. The FPID includes an array of switch cells, each interconnecting a separate pair of the ports and each having first and second control signal inputs. When the first and second control signal inputs are both asserted, the switch cell provides a signal path between the pair of the ports it interconnects. The FPID also includes sets of first and second memory cells for storing data. Each first memory cell corresponds to a separate one of the switch cells and selectively asserts or deasserts the first control signal input to the corresponding switch cell as indicated by its stored data. Each second memory cell corresponds to a separate group of switch cells and selectively asserts or deasserts the second control signal input to each switch cell of its corresponding group according to its stored data. A memory controller within the FPID receives each command from the host controller and writes data included in the command into each memory cell of a particular subset of the first and second memory cells upon receipt of the command. The address included in the command indicates the particular subset into which the controller is to write the data. In accordance with the invention, the number of memory cells included in the particular subset is a variable function of the address.

When appropriate data is stored in the first set of memory cells, the host controller can cause any individual switch cell to make or break a signal path between a pair of ports by sending a single command telling the memory controller to write data to a single first memory cell. Conversely, when data is stored in the second memory cells, the host controller can also cause a group of switch cells to make or break several signal paths by sending a single command telling the memory controller to write data to a single second memory cell. Furthermore, since the number of second memory cells to which the memory controller writes data conveyed in a command is a variable function of the address conveyed in the command, the host controller can alter the signal routing states of variable numbers of switch cells with a single command.

The FPID of the present invention is particularly suited to rapidly switching between parallel buses of varying sizes connected to its ports. The host controller initially commands the memory controller to store data in separate groups of the first set of memory cells such that each group interconnects the buses according to a different pattern when enabled by the group's second control signal inputs. The host controller also commands the memory controller to store data in the second memory cells such that only one group of switch cells is enabled so as to interconnect the buses according to one desired pattern. Thereafter, whenever the bus interconnection pattern is to change, the host controller can select a different bus connection pattern by sending only one or two commands to the memory controller telling it to alter data in selected groups of the second memory cells. Since the size of the groups of switch cells affected by a command is a variable function of the address included in the command, the host controller can adjust the switch cell group size to suit the size of buses connected to the FPID and can therefore cause the FPID to make or break a connection between two buses by sending only a single command to the FPID.

It is accordingly an object of the invention to provide an improved FPID which allows for rapidly switching between buses connected to its ports.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

DESCRIPTION OF THE PREFERRED EMBODIMENT(S)

Figure 1:
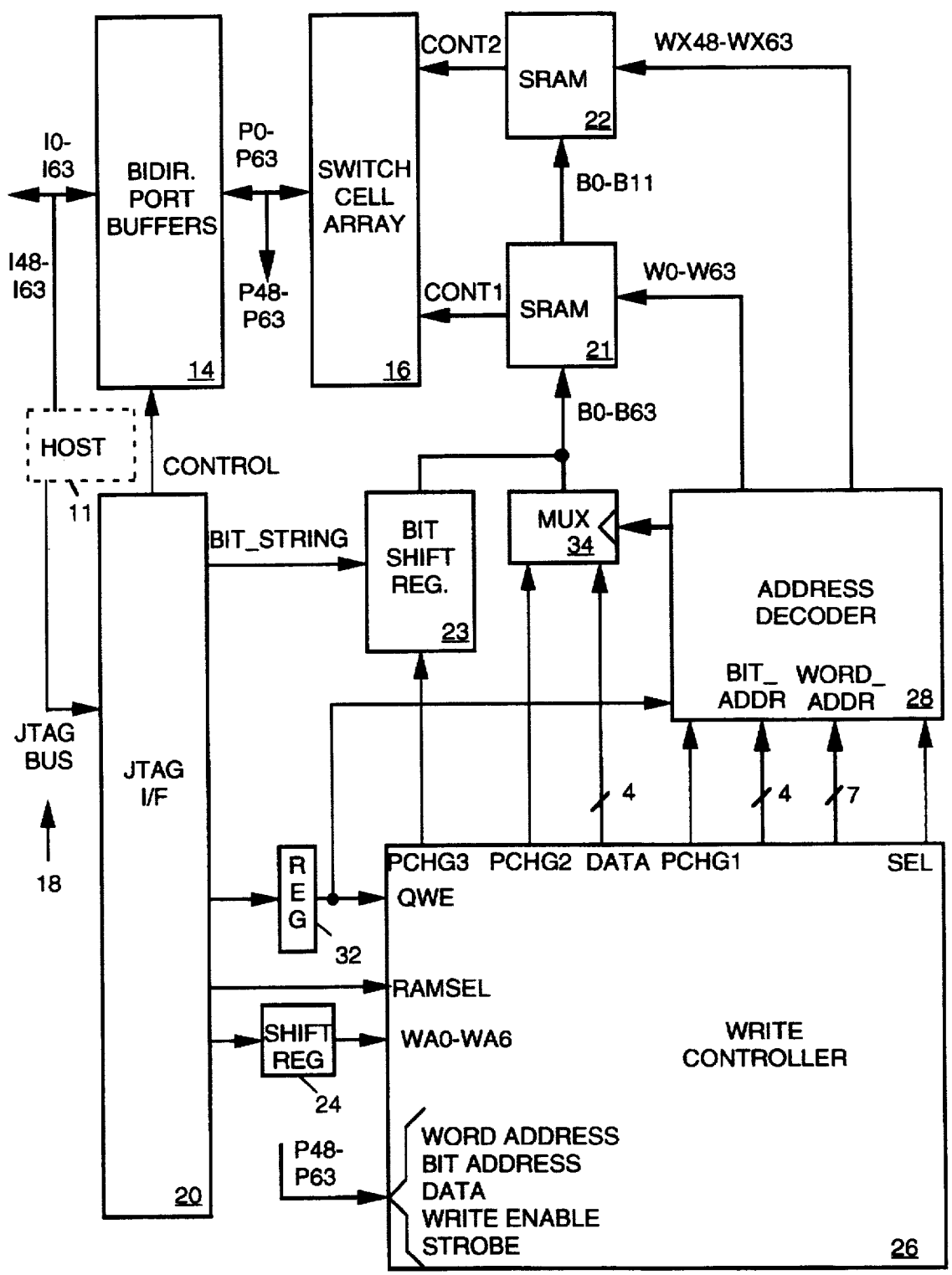
FIG. 1 is a block diagram illustrating a field programmable interconnect device in accordance with the present invention.

FIG. 1 is a block diagram of a field programmable interconnect device (FPID) 10 in accordance with the present invention. In response to commands from a host controller 11, FPID 10 selectively interconnects pairs of input/output (I/O) lines I0–I63 to provide unidirectional or bidirectional signal paths therebetween. In the preferred embodiment of the invention FPID 10 may interconnect up to 64 I/O lines, however in alternative embodiments FPID 10 may handle a larger or smaller number of I/O lines. FPID 10 includes a set of buffers 14 for buffering signals between each I/O line I0–I63 and a corresponding one of port P0–P63 of a switch cell array 16. Buffers 14 are bidirectional in that they can buffer signals in either direction between the I/O line I0–I63 and the corresponding port P0–P63. Buffers 14 automatically sense the direction of signal flow and provide buffering in the sensed direction. They do not require externally generated direction indicating signals. Buffers 14 are described in detail in U.S. Pat. No. 5,202,593, titled BI-DIRECTIONAL BUS REPEATER, issued Apr. 13, 1993 to Huang et al and incorporated herein by reference.

Switch Array

Figure 2:
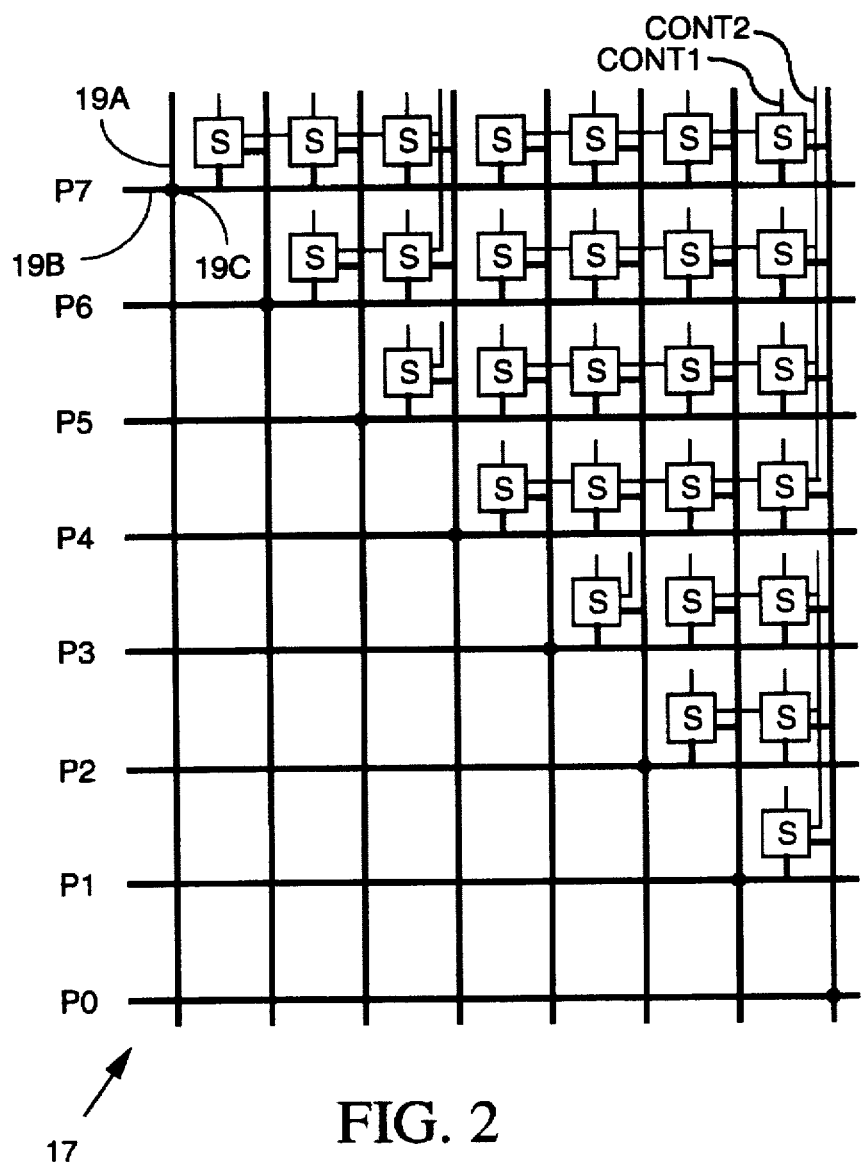
FIG. 2 is a block diagram of the switch cell array of FIG. 1.

FPID 10 also includes a 64×64 triangular crosspoint switch cell array 16 for selectively routing bidirectional signals between pairs of ports P0–P63. FIG. 2 illustrates an 8×8 triangular switch array 17, a smaller version of array 16 of FIG. 1. Array 17 includes a set of 8 vertical conductors 19A, a set of 8 horizontal conductors 19B and a triangle array of switch cells S. Each port P0–P7 is connected to a separate vertical line 19A. Each vertical line 19A is connected to a corresponding horizontal line 19B at an intersection 19C so that each port P0–P7 forms a node that extends both horizontally and vertically through the array. One switch cell S is provided for selectively interconnecting each a unique pair (PX, PY) of ports P0–P7 where X and Y are integers from 0 through 7, and X does not equal Y. The 64×64 array 16 of FIG. 1 has a similar layout having 64 vertical and 64 horizontal conductors with a triangular array of switch cells having from 1 to 63 cells S in each row and column.

Figure 3:
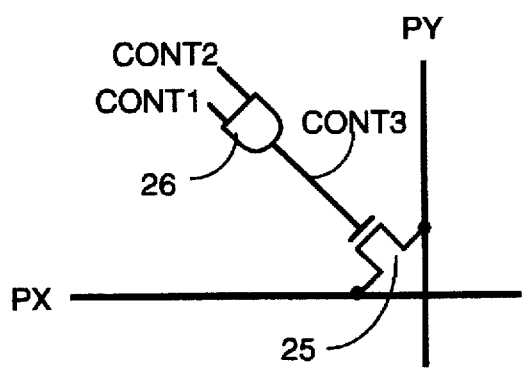
FIG. 3 is a block diagram of a switch cell of the array of FIG. 2.

FIG. 3 illustrates a typical switch cell S of FIG. 2, including a pass transistor 25 connected between ports PX and PY and an AND gate 26 receiving a pair of signals (CONT1 and CONT2) at its inputs. The output (CONT3) of AND gate 26 controls the gate of transistor 25. Referring to FIGS. 2 and 3, each switch cell S conveys signals bidirectionally between the corresponding port pair (PX, PY). When CONT1 and CONT2 are both asserted, the switch S interconnects the corresponding port pair (PX, PY) and conveys signals bidirectionally there between. A separate CONT1 signal is supplied to each switch cell S of the array. A separate CONT2 signal is provided to each 4×4 subarray of switch cells S. (Note that due to the triangular layout of array 16 not every "4×4 subarray" is fully populated with switch cells S.) When a CONT2 signal is deasserted, no switch cell S of the 4×4 subarray that receives the CONT2 signal interconnects its ports. When a CONT2 signal input to a 4×4 subarray is held high, the separate CONT1 signal input to each cell S of the 4×4 subarray determines whether that cell S provides a signal path between its corresponding pair of ports (PX, PY).

Referring again to FIG. 1, FPID 10 also includes static random access memories (SRAMs) 21 and 22. SRAM 21 is a triangular array of addressable memory cells, each memory cell storing a single bit. Each memory cell in SRAM 21 produces as output a separate one of the CONT1 signals supplied to a corresponding switch cell within array 16. The state of each CONT1 signal is controlled by the state of the bit stored in a separate memory cell within SRAM 21. SRAM 22 is also a triangular array of addressable memory cells, each of which also stores a single bit. Each memory cell of SRAM 22 corresponds to a separate one of the 4×4 switch cell subarrays of array 16 and asserts or deasserts the CONT2 signal controlling the corresponding switch cell subarray in response to the state of its stored bit.

The two SRAMs 21 and 22 provide hierarchical levels of control over switch cell array 16. At the lowest level of control when a host controller writes data bits to selected SRAM 21 cells, each data bit can make or break a connection between a selected pair of ports P0–P63. At higher levels of control, a host controller may write data bits to selected cells in SRAM 22 where each data bit can affect connections between a variable number of pairs of port P0–P47.

When operating at the lowest level of control, the host controller initializes the FPID by writing a logical "1" bit into all of the cells of SRAM 22 so that all of the CONT2 signals are initially asserted and none of the switch cells of array 16 are inhibited from making a connection when their CONT1 signals are asserted. The host controller may then write data into SRAM 21 to control whether any switch cell provides a signal path between two ports. The host controller makes a connection between any two ports P0–P63 by setting the state of a bit stored in a particular memory cell of SRAM 21 to a logical "1" and breaks the connection by setting the bit back to a logical "0". Thus when operating at the lowest level of control, the host controller writes a separate data bit into SRAM 21 whenever it wishes to make or break a connection between two ports.

To operate at a higher level of control, the host controller first initializes the FPID by writing data into all of the cells of SRAM 21 such that various sets of switch cells of array 16, when enabled by their CONT2 signals, connect I/O ports in alternative connection patterns. Thereafter when the host controller wants to select one of the alternative connection patterns, it writes data only to selected memory cells within SRAM 22. By writing data to SRAM 22, the host controller selects CONT2 signals to be asserted or deasserted so as to enable or inhibit particular sets of switch cells that produce the desired connection patterns.

The higher levels of control provide for faster switching between, for example, three parallel buses A, B and C connected to I0–I47. Each bus may have for example 16 lines. A host controller initially loads data into SRAM 21 so that one 16×16 block of cells in array 16, when enabled by CONT2 signals, connects bus A to bus B and so that a second 16×16 block of cells in array 16, when enabled by other CONT2 signals, connects bus A to bus C. Thereafter, the host controller writes appropriate data to SRAM 22, rather than SRAM 21, whenever bus A is to be switched between bus B and bus C. The host controller could write data to SRAM 21 to switch bus A from bus B to bus C. But since each bit in SRAM 22 controls many more cells in array 16 than a bit in SRAM 21, the host controller writes less data to SRAM 22 when changing interconnection patterns. Since transferring data from a host controller to FPID 10 requires time, the higher control level provided by SRAM 22 speeds up bus switching operations.

Memory cells of SRAM 21 are addressed by 64 "word" lines W0–W63 and 64 "bit" lines B0–B63. SRAM 22 is addressed by 16 word lines WX48–WX63 and 12 bit lines B0–B11. Since memories 21 and 22 are static RAMs, each bit "line" actually requires two conductors and conveys a differential signal indicating a state (high, low or tristated) of a bit to be stored in the array. Those skilled in the art will appreciate that other types of memory cells well known in the art may be employed. When one of word lines W0–W63 is asserted, each memory cell along one row of memory cells within SRAM 21 receives and stores a bit appearing on a corresponding bit line B0–B63. If a bit line is tristated, the contents of the addressed memory cell remains unchanged. Thus to write data to a memory cell row within SRAM 21, the FPID places 64 bits of data on bit lines B0–B63 and then strobes a selected one of the W0–W63 word lines. The 12×12 SRAM 22 is write accessed in a similar fashion. The B0–B11 signals convey data to each row of up to twelve memory cells and each of the twelve rows of memory cells is write enabled by a separate word line WX48–WX63. FPID 10 permits a host controller to use two modes for addressing and write accessing SRAMs 21 and 22, the "normal" mode and the "rapid" connect mode. These alternative modes are described below.

Normal Mode Operation

Referring again to FIG. 1, in the normal mode of operation data for controlling operation of FPID 10 is transferred in serial fashion from a host controller to FPID 10 via an IEEE standard 1149.1 "JTAG" bus 18. A JTAG interface circuit 20 receives and executes incoming instructions on JTAG bus 18. These instructions tell the JTAG interface circuit 20 to store data conveyed on the JTAG bus 18 in registers within FPID 10 at register addresses conveyed with the data. Some of these instructions tell the JTAG interface circuit 20 to store data in registers within buffers 14. This data selects operating characteristics of buffers 14, including for example whether a buffer 14 level shifts, blocks or inverts the signal it buffers. Other instructions received on the JTAG bus 18 convey data to be stored in SRAMs 21 and 22 which in turn control the switching operation of cell array 16. A suitable JTAG interface circuit is taught in U.S. Pat. No. 5,282,271 titled I/O BUFFERING SYSTEM TO A PROGRAMMABLE SWITCHING APPARATUS issued Jan. 25, 1994 to Wen-Jai Hsieh et al, incorporated herein by reference.

To write data into SRAM 21 or SRAM22, the host controller serially transmits a 64-bit string (BIT_STRING) to interface circuit 20 via JTAG bus 18 along with commands telling the JTAG I/F circuit 20 to serially shift BIT_STRING into a serial- in/parallel-out shift register 23. The host controller next uses the JTAG bus 18 to serially transmit a 7-bit word address WA0–WA6 to interface circuit 20 along with control and address bits telling circuit 20 to load that word into another serial- in/parallel-out shift register 24. A write controller circuit 26 passes the WA0–WA6 data in register 24 as a 7-bit word address (WORD_ADDR) to an address decoder 28. Finally, the host controller sends an instruction to JTAG interface circuit 20 telling it to transmit a RAMSEL signal to write controller 26. Controller 26 responds to the RAMSEL signal by asserting an output SEL signal supplied to address decoder 28. Decoder 28 responds to the SEL signal by decoding the 7-bit WORD_ADDR to determine which of the word lines W0–W63 or WX48–WX63 is being addressed. Controller 26 then pulses a precharge signal (PCHG1) telling decoder 28 to assert the addressed word line and a PCHG2 signal telling shift register 23 to latch its stored 64-bit data onto the bit lines B0–B63. The data appearing on the bit lines are stored in the particular row of memory cells accessed by the selected one of word lines W0–W63 or WX48–WX63.

Rapid Connect Mode—Low Level Control

A host controller may need to change only the bit stored in the memory of a single crosspoint array cell, thereby to make or break a single connection between two specific FPID I/O ports P0–P63. However, to do so in the normal mode of FPID 10 operation, the host controller must transmit 64 data bits to the write controller 26 and must also send many control and address bits via the serial JTAG bus 18. The transmission requires a substantial number of JTAG bus clock cycles. While the normal mode of operation is relatively fast and efficient at loading data into all cells of SRAMs 21 and 22, it is relatively slow and inefficient at loading data into only a few selected cells of SRAMs 21 and 22.

In the alternative rapid connect mode of operation the host controller accesses FPID 10 via a parallel control bus, rather than the serial JTAG bus 18, and writes bits into four adjacent memory cells of array 21 in a single cycle of that parallel bus. In the preferred embodiment of the invention, the parallel control bus is tied to I/O ports I48–I63 which access ports P48–P63 of switch cell array 16. Since the rapid connect mode makes use of ports P48–P63 for conveying programming information, these ports should not be used for switching purposes when the FPID is to operate in the rapid connect mode. (In alternative embodiments the parallel bus may use separate dedicated FPID input ports not connected to array 16.) Before entering the rapid connect mode, all memory cells within SRAMs 21 and 22 should be set to desired initial states using the normal mode of write accessing these SRAMs. In particular, data in all memory cells of SRAM 21 along word lines W48–W63 and all memory cells of SRAM 21 along bit lines B48–B63 should be set to logical "0" to inhibit operation of corresponding switch cells in array 16 that switch ports P48–P63.

In the rapid connect mode, ports P48–P63, accessed via I/O lines I48–I63 and buffers 14, are used as a 16-bit parallel bus for conveying an instruction to write controller 26 from a host controller or other control data source. Table I lists the function of each bit conveyed by that 16-bit instruction.

TABLE I

| PORT | FUNCTION |
|---|---|
| P63 | Strobe |
| P62 | Write Enable |
| P58–P61 | Data |
| P54–P57 | Bit Address |
| P48–P53 | Word Address |

The word address (P48–P53) is a 6-bit value indicating a particular one of the 48 word lines (W0–W47) for write enabling a memory cell of interest. The bit (line) address (P54–P57) is a 4-bit value selecting a particular subset of four adjacent bit lines of the 48 bit lines (B0–B47) leading to the four memory cells of interest. The data bits (P54–P57) indicate how the four bit lines of the selected subset are to be controlled. The write enable signal (P62) is held low to enable the data and addresses to be written into controller 26 of FIG. 1. The strobe signal (P63) is asserted to initiate a memory write operation after the data and addresses are delivered to controller 26.

When the FPID is in the normal mode of operation a QWE bit of logic state "0" is stored in register 32. When entering the rapid connect mode, the host controller transmits via the JTAG bus an instruction telling JTAG I/F circuit 20 to set the state of the QWE bit in a register 32 to a logical "1". This bit tells controller 26 to operate in the rapid connect mode rather than in the normal mode. Thereafter to change the state a bit stored in a single memory cell of interest within array 16, the host controller transmits a command to controller 26 via ports P48–P63. The command includes a word address appearing at ports P48–P53, a bit address appearing at ports P54–P57 and data appearing at ports P58–P61. While holding the write enable bit P62 low, the host controller pulses a strobe input of controller 26 via port P63, thereby initiating a memory write operation.

Write controller 26 responds to the pulse at its P63 strobe input by forwarding the 7-bit (WORD_ADDR) address and the 4-bit (BIT_ADDR) to address decoder 28 and by forwarding the 4-bit DATA value to a multiplexer 34. The controller 26 then asserts (pulls low) the SEL signal to input enable decoder 28. Decoder 28 controls multiplexer 34 which places the four DATA bits on a selected four of bit lines B0–B63 of switch array 16. Bit addresses 0, 4, . . . 44 tell decoder 28 to cause multiplexer 34 to-select bit lines (B0–B3), (B4–B7) (B44 . . . B47), respectively. Bit addresses (1–3), (5–7) . . . (45–47) are invalid when using the rapid connect mode to write to SRAM 21.

After supplying the word and bit addresses to decoder 28, controller 26 pulses the PCHG1 signal to tell decoder 28 to decode the word and bit addresses. Decoder 28 asserts a particular one of word lines W0–W47 thereby write enabling a selected memory cell row of interest for receiving data appearing on the bit lines. Decoder 28 switches multiplexer 34 so that it drives high or low the selected four bit lines of B0–B47 in response to a PCHG3 signal from write controller 26, thereby setting the bit stored in each of the four cells at the intersections of the row and columns of interest to logical "1" or "0" as indicated by the DATA input. Multiplexer 34 tri-states all unselected bit lines so that data bit values previously stored in the word addressed row of SRAM 21 cells (other than the four addressed cells) remain unchanged. Thereafter, when write controller 26 deasserts the SEL signal, the rapid connect operation is complete. Thus a rapid connect operation requires only a single cycle of a parallel control bus connected to ports P48–P63 and allows the host controller to write bits to a selected four adjacent memory cells along of any particular row of SRAM 21 while leaving the states of bits in all other memory cells unchanged.

Rapid Connect Mode—Hierarchical Control

The host controller may also use the rapid connect mode to write access SRAM 22. A hierarchical SRAM 22 address decoding scheme, implemented by decoder 28 in accordance with the present invention, permits the host controller to selectively inhibit or enable four 4×4, 4×8, or 4×16 subarrays of switch cells within array 16 by sending only a single command to the write controller 26 via the control bus connected to ports P48–P63.

SRAM 22 is a 12×12 memory array write accessed via 12 bit lines B0–B11 and 12 word lines WX48–WX63. As previously mentioned, the FPID 10 is set to operate in the rapid connect mode by setting the QWE bit in register 32 true. This QWE bit is also supplied as input to address decoder 28. When decoder 28 receives a word address (WORD_ADDR) from 48–63 with the QWE bit indicating that the system is in the rapid connect mode, decoder 28 selects the appropriate word line or lines WX48–WX63 rather than one of word lines W48–W63 so that data on bit lines B0–B11 is written into SRAM 22 rather than SRAM 21. When address decoder 28 determines from the QWE bit and the word address that SRAM 22 is being addressed, it decodes the combination of BIT_ADDR and WORD_ADDR in the manner indicated below in TABLE II.

TABLE II

| DECODE MODE | BIT ADDR | WORD ADDR | BIT LINE | WORD LINE |
|---|---|---|---|---|
| NIBBLE | 0 | 1 | B0–B3 | WX(1) |
| NIBBLE | 16 | 1 | B4–B7 | WX(1) |
| NIBBLE | 32 | 1 | B8–B11 | WX(1) |
| BYTE | 4 | m | B0–B3 | WX(m), WX(m+1) |
| BYTE | 20 | m | B4–B7 | WX(m), WX(m+1) |
| BYTE | 36 | m | B8–B11 | WX(m), WX(m+1) |
| WORD | 12 | n | B0–B3 | WX(n) . . . WX(n+3) |
| WORD | 28 | n | B4–B7 | WX(n) . . . WX(n+3) |
| WORD | 44 | n | B8–B11 | WX(n) . . . WX(n+3) |

The first three rows of TABLE II indicate the "nibble" mode of decoding the word and bit addresses. In the nibble mode, the four bits of DATA are written to four adjacent memory cells in SRAM 22 that lie along a single word line.

In Table II the variable "1" may have any value in the set {48, . . . , 63}. For example, when BIT_ADDR is 0 and WORD_ADDR is 48, decoder 28 places the four bit DATA on bit lines B0-B3 and asserts word line WX48, thereby writing the four bits of data into four adjacent cells of SRAM22 along word line WX48. Or for example, when BIT_ADDR is 32 and WORD_ADDR is 57, decoder 28 places the four bit DATA on bit lines B8-B11 and asserts word line WX57 to write DATA into four cells along word line WX48. Since the bit in each memory cell of SRAM 22 inhibits or enables a 4×4 block of cells within switch cell array 16, then by writing bits to four cells in SRAM 22, the host controller can inhibit or enable four 4×4 blocks of switch cells within array 16.

The second three rows of TABLE II indicate the "byte" mode of address decoding. In the byte mode, the four bits of DATA are written to four adjacent memory cells in SRAM 22 lying along each of two adjacent word lines. In Table II the variable "m" may have any value in the set {48, 50, 52, 54, 56, 58, 60, 62}. For example, when BIT_ADDR is 4 and WORD_ADDR is 48, decoder 28 places the four bit DATA on bit lines B0-B3 and asserts word lines WX48 and WX49, thereby writing the four bits of data into four adjacent cells of SRAM 22 along each word line WX48 and WX49. Or for example, when BIT_ADDR is 20 and WORD_ADDR is 50, decoder 28 places the four bit DATA on bit lines B4-B7 and asserts word lines WX50 and WX51 to write DATA into four cells along each word line WX50 and WX51. Since the bit in each memory cell of SRAM 22 inhibits or enables a 4×4 block of cells within switch cell array 16, then by writing bits to the eight cells in SRAM 22, we inhibit or enable four 4×8 blocks of switch cells. When two adjacent data bits are set to logical "1" or logical "0", an 8×8 block of switch cells is enabled or inhibited. An 8×8 block of switch cells is sufficient to switch 8-bit (byte) buses.

The third three rows of TABLE II illustrate the "word" mode of writing data to SRAM 22. In the word mode, the four bits of DATA are written to four adjacent memory cells in SRAM 22 that lie along each of four adjacent word lines. In Table II the variable "n" may have any value in the set {48,52,56,60}. For example, when BIT_ADDR is 12 and WORD_ADDR is 48, decoder 28 places the four bit DATA on bit lines B0-B3 and asserts word lines WX48, WX49, WX50 and WX51, thereby writing the four bits of data into four adjacent cells of SRAM 22 along word lines WX48-WX51, a total of sixteen cells. Since the bit in each memory cell of SRAM 22 inhibits or enables a 4×4 block of cells within switch cell array 16, then by writing bits to sixteen cells in SRAM 22, the host controller inhibit or enable a four 4×16 blocks of switch cells. When all four data bits are set to a "1" or "0", a 16×16 block of switch cells is sufficient two switch 16-bit (word) buses.

The rapid connect mode of writing data to SRAM 22 is particularly useful when switching parallel buses connected to the FPID ports. For example suppose we want to switch an 8-bit bus A between two 8-bit buses B and C. The host controller initially loads data into SRAM 21 such that a first 8×8 block of switch cells interconnects bus A to bus B when enabled by their CONT2 signals and such that a second 8×8 block of cells interconnects bus A to bus C when enabled by their CONT2 signals. The host controller also initially loads data into all of the SRAM2 cells to turn off all the CONT2 signals such that no ports are interconnected. Thereafter using the rapid connect byte or word mode of addressing, the host controller can with one command to the write controller turn on all of the CONT2 signals to the first 8×8 block, thereby connecting bus A to bus B. Later, with a single command to the write controller, the host controller can turn off all the CONT2 signals to the first 8×8 block. The controller can with another command turn on all the CONT2 signals to the second 8×8 block. This causes the FPID to disconnect bus A from bus B and to connect bus A to bus C. Since the operation requires only one cycle of the rapid connect control bus to make or break a bus connection, the FPID can rapidly switch the buses.

The alternative nibble, byte and word modes of SRAM 22 addressing provided by decoder 28 of FIG. 1 makes the size of the switch cell subarrays affected by a rapid connect write operation a variable function of the address conveyed in the rapid connect command from the host controller. This gives the FPID flexibility in switching varying sizes of parallel buses. The nibble mode is most useful for 1 cycle switching of 4 bit parallel buses, the byte mode is most useful for one cycle switching 8 bit buses and the word mode is useful for one cycle switching of 16 bit buses.

Write Controller

Figure 4:
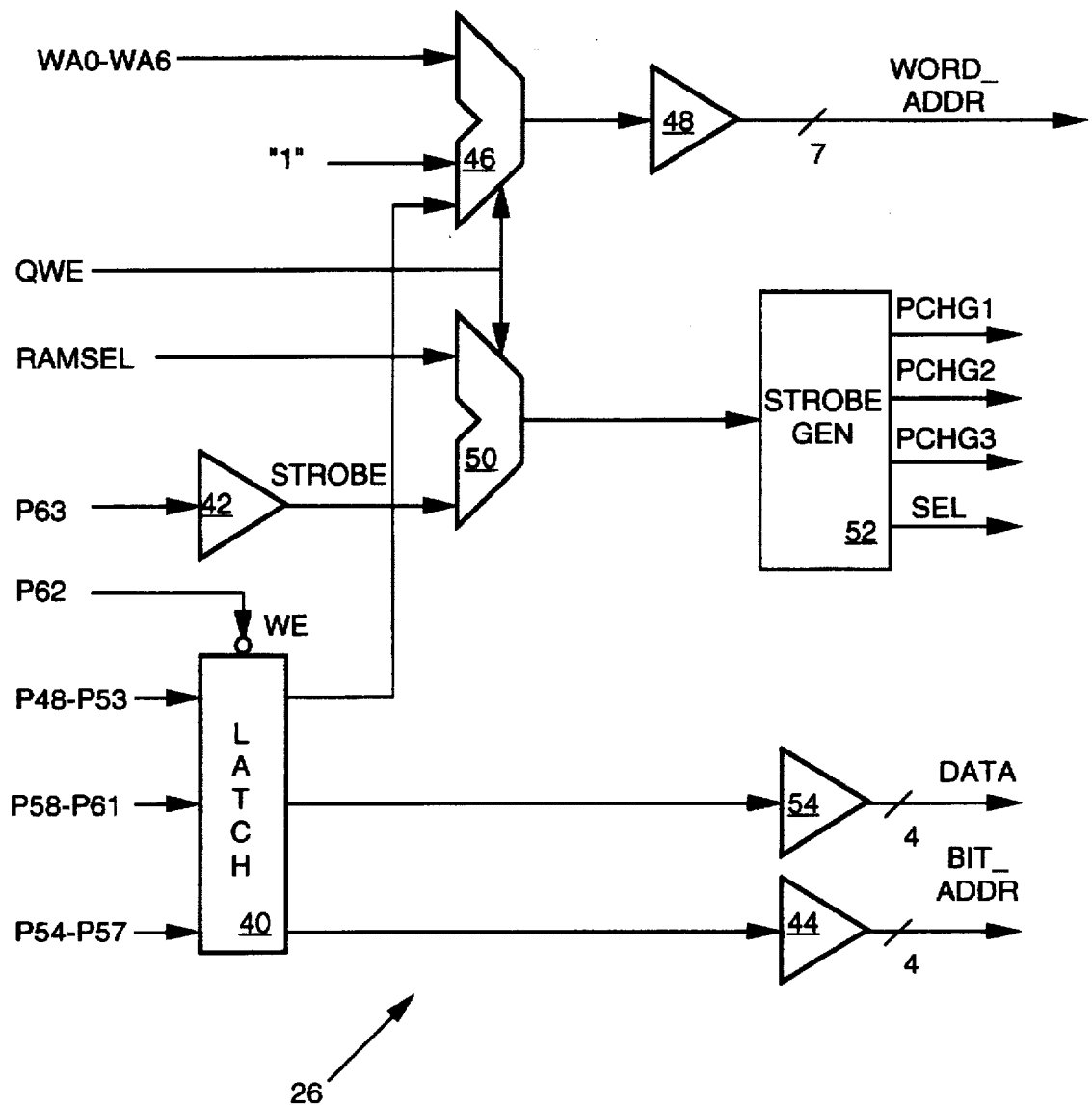
FIG. 4 is a block diagram illustrating details of the write controller of FIG. 1.

FIG. 4 illustrates write controller 26 of FIG. 1 in more detailed block diagram form. The word and bit addresses and the 4 data bits appearing on ports P48-P61 arrive at a latch 40 operated by write enable signal on port P62. The four DATA bits on P58-P61 are forwarded to multiplexer 34 of FIG. 1. The bit address on P54-P57 is latched onto the input of another buffer 44, the output of which is delivered to address decoder 28 of FIG. 1. The 6-bit word address arriving via ports P48-P53 and a single hardwired "1" bit are latched onto the input of a multiplexer 46 while the 7-bit word address WA0-WA6 provided by shift register 24 of FIG. 1 is supplied to a second input of multiplexer 46. The QWE signal from register 32 of FIG. 1 controls multiplexer 46 and selects one of the 7-bit word addresses appearing at its inputs for transmission to a buffer 48 depending on whether the FPID is operating in the normal or rapid connect mode. Buffer 48 forwards the selected word address to address decoder 28 of FIG. 1. A second multiplexer 50, also controlled by the QWE signal, selects the RAMSEL signal from JTAG interface circuit 20 of FIG. 1 and forwards it to a strobe signal generator 52 when the FPID is operating in the normal mode. The STROBE signal at port P63, buffered by buffer 42 is supplied as another input to multiplexer 50. In the rapid connect mode, multiplexer 50 selects the STROBE signal input forwards it to strobe generator 52. The strobe generator 52 also receives the QWE bit indicating whether the system is in the rapid connect mode. On receipt of the RAMSEL or STROBE signal, strobe generator 52 generates the SEL signal transmitted to address decoder 28 of FIG. 1 followed by the PCHG1, and the PCHG3 signal transmitted to shift register 23 (normal mode) or the PCHG2 signal to address decoder 28 of FIG. 1 (rapid connect mode).

Parallel Port Expansion

In an alternative embodiment of the invention, the number of FPID 10 ports are expanded by a factor of N by providing N (where N is greater than one) switch cell arrays similar to array 16 and by increasing the number of port buffers 14 by a factor of N. Thus for example, FPID 10 of FIG. 1 can be expanded to handle 512 ports by providing 512 buffers and eight 64-port switch cell arrays (N=8). The N switch cell arrays are all controlled by the same routing data stored in SRAMs 21 and 22 so that they operate in parallel to provide similar routing patterns. An N-array system is suitable for switching a large number of N-bit buses. In such application, each line of each N-bit bus may be connected to a corresponding port of a separate one of the N arrays. In such configuration, a single bit in SRAM 21 of FIG. 1 could make or break a connection between any two N-bit buses and a bit in SRAM 22 could inhibit or enable connections between 16 N-bit buses. The host controller programs an N-array FPID in normal and rapid connect modes in manner discussed herein above in connected with the single switch cell array version of FIG. 1.

Figure 5:
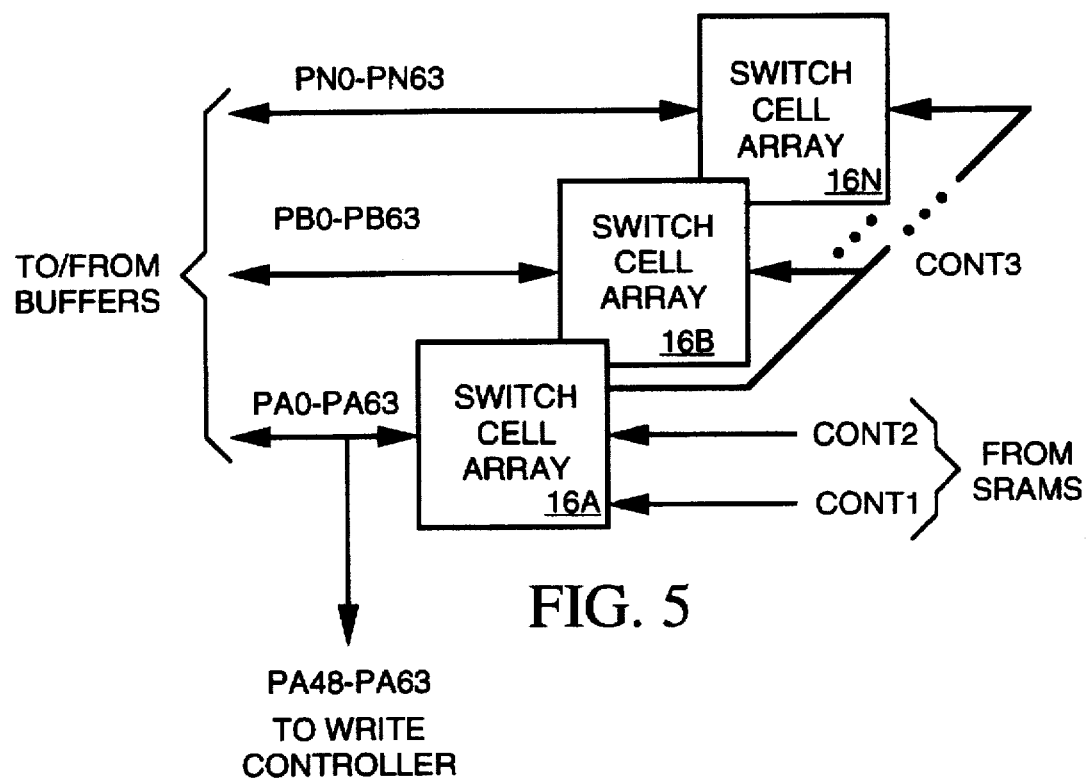
FIG. 5 is a block diagram illustrating interconnections for a set of switch cell arrays in accordance with an alternative embodiment of the present invention.

FIG. 5 illustrates interconnections between a set of N switch cell arrays 16A–16N. Array 16A provides ports PA0–PA63, array 16B provides ports PB0–PB63, and array 16N provide ports PN0–PN63. (Arrays 16C through 16N-1 are not shown in FIG. 5). The layout of array 16A is identical to that of array 16 of FIG. 1 as illustrated in FIGS. 2 and 3. The layout of each array 16B–16N is similar to that of array 16 except that arrays 16B–16N do not include AND gate 26 of FIG. 3. In arrays 16B–16N the gate of pass transistor 25 of each switching cell is instead controlled by the output (CONT3) of the AND gate 26 of a corresponding cell of array 16A. Thus corresponding cells of arrays 16A–16N operate in parallel. Only ports PA48–PA63 of array 16A are provided as the rapid connect bus input to write controller 26 of FIG. 1.

Figure 6:
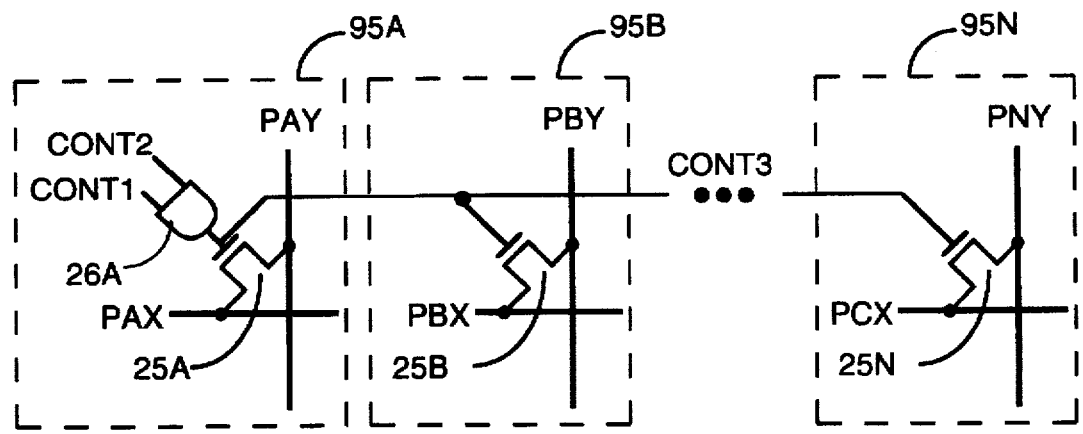
FIG. 6 is a block diagram of typical corresponding switch cells of the arrays of FIG. 5.

FIG. 6 illustrates the layout of corresponding switching cells of arrays 16A–16N of FIG. 5. A transistor 25A within a cell 95A of array 16A interconnects ports PAX and PAY (where X and Y have values from 0–63 and Y and X are not equal). Similarly transistors 25B–25N within cells 95B–95N of arrays 16B–16N interconnect corresponding ports P*X and P*Y. Only cells of switch array 16A include an AND gate 26A for receiving the CONT1 and CONT2 signals from SRAMs 21 and 22 of FIG. 2. The output CONT3 of AND gate 26 of cell 95A controls the pass transistor 25A–25N of all N corresponding switching cells 95B–95N. Thus whenever transistor 25A turns on to interconnect ports PAX and PAY of array 16A, transistors 25B–25N also turn on to interconnect the corresponding ports P*X and P*Y of cells 95B–95N.

Thus has been shown and described an improved field programmable interconnect device in accordance with the present invention employing a crosspoint switch array to interconnect input ports wherein each switch cell in the array must receive two control signals in order to provide a signal path between array ports. The first control signal input to each cell is controlled by a separate memory cell of a first addressable SRAM and the second control signal input to each 4×4 subarray is controlled by a separate memory cell of a second SRAM. A host controller can write data to the SRAMs using commands conveyed to the FPID via serial or parallel buses, the commands indicating addresses of memory cells to receive the data. When writing to the second SRAM via the parallel bus, the number of SRAM cells to which the data conveyed by the command is written is a variable function of the address conveyed by the command. This provides flexibility in the size of a subarray of switch cells that are affected by the command, and thereby provides flexibility in the size of parallel buses that may be quickly switched by the FPID.

While the forgoing specification has described preferred embodiment(s) of the present invention, one skilled in the art may make many modifications to the preferred embodiment without departing form the invention in its broader aspects. For example switch array 16 may be larger or smaller, the rapid connect control bus may be separate from the I/O ports, and address decoder 28 may provide addressing modes in addition to the nibble, byte and word modes illustrated. The appended claims therefore are intended to cover all such modifications as fall within the true scope and spirit of the invention.

We claim:

1. An apparatus for selectively routing signals between signal ports in response to a command from a host controller, said command including an address and data, the apparatus comprising:

a plurality of switch cells, each switch cell receiving an input control signal and providing a signal path between a separate pair of said signal ports in response to assertion of said input control signals;

a plurality of memory cells, each memory cell storing data and selectively asserting or deasserting the control signal input to at least one of the switch cells according to the stored data; and memory controller means receiving said command from said host controller for writing data included in the command into each memory cell of a particular subset of said memory cells upon receipt of the command, wherein the address included in said command indicates the particular subset of memory cells, and wherein a number of memory cells included in the particular subset is a variable function of the address.

2. The apparatus in accordance with claim 1 further comprising a parallel bus for concurrently conveying the address and data included in said command from said host controller to said memory controller.

3. The apparatus in accordance with claim 2 wherein said parallel bus is connected to a plurality of said signal ports.

4. An apparatus for selectively routing signals between signal ports in response to a command from a host controller, said command including an address and data, the apparatus comprising:

a plurality of switch cells, each switch cell receiving input first and second control signals, each switch cell providing a signal path between a separate pair of said signal ports in response to concurrent assertion of said input first and second control signals;

a set of first memory cells, each first memory cell storing data and selectively asserting or deasserting the first control signal input to a separate one of the switch cells according to the stored data;

a set of second memory cells, each second memory cell storing data and selectively asserting or deasserting the second control signal input to a separate group of the switch cells according to the stored data; and memory controller means receiving said command from said host controller for writing data included in the command into each memory cell of a particular subset of said second memory cells upon receipt of the command, wherein the address included in said command indicates the particular subset of memory cells, and wherein a number of memory cells included in the particular subset is a variable function of the address.

5. The apparatus in accordance with claim 4 further comprising a parallel bus for concurrently conveying the address and data included in said command from said host controller to said memory controller.

6. The apparatus in accordance with claim 5 wherein said parallel bus is connected to a plurality of said signal ports.

7. An apparatus for selectively routing signals between signal ports in response to serial and parallel input commands from a host controller, each serial input command and each parallel input command including an address and data, the apparatus comprising:

a plurality of switch cells, each switch cell receiving input first and second control signals, each switch cell providing a signal path between a separate pair of said signal ports in response to concurrent assertion of said input first and second control signals;

a set of first memory cells, each first memory cell storing data and selectively asserting or deasserting the first control signal input to a separate one of the switch cells according to the stored data; and a set of second memory cells, each second memory cell storing data and selectively asserting or deasserting the second control signal input to a separate group of the switch cells according to the stored data;

memory controller means for receiving said serial input commands from said host controller and writing data included in each serial input command into a first subset of said first memory cells upon receipt of said serial input command, the first subset being identified by the address conveyed in the serial input command, and for receiving said parallel input commands from said host controller and writing data included in each parallel input command into a second subset of said second memory cells upon receipt of said parallel input command, wherein the address included in said parallel command identifies the second subset of memory cells, and wherein a number of memory cells included in the particular subset is a variable function of the address.

8. The apparatus in accordance with claim 7 further comprising a parallel bus for concurrently conveying the address and data included in said parallel command from said host controller to said memory controller.

9. The apparatus in accordance with claim 8 wherein said parallel bus is connected to a plurality of said signal ports.

10. The apparatus in accordance with claim 8 further comprising a serial bus for serially conveying the address and data included in said serial command from said host controller to said memory controller.

11. An apparatus for selectively routing signals between signal ports in response to serial and parallel input commands from a host controller, each serial input command and each parallel input command including an address and data, the apparatus comprising:

a plurality of switch cells, each switch cell receiving input first and second control signals, each switch cell providing a signal path between a separate pair of said signal ports in response to concurrent assertion of said input first and second control signals;

a set of first memory cells, each first memory cell storing data and selectively asserting or deasserting the first control signal input to a separate one of the switch cells according to the stored data; and a set of second memory cells, each second memory cell storing data and selectively asserting or deasserting the second control signal input to a separate group of the switch cells according to the stored data;

memory controller means for receiving said serial input commands from said host controller and writing data included in each serial input command into a first subset of said first and second memory cells upon receipt of said serial input command, the first subset being identified by the address conveyed in the serial input command, and for receiving said parallel input commands from said host controller and writing data included in each parallel input command into a second subset of said second memory cells upon receipt of said parallel input command, wherein the address included in said parallel command identifies the second subset of memory cells, and wherein a number of memory cells included in the particular subset is a variable function of the address.

12. The apparatus in accordance with claim 11 further comprising a parallel bus for concurrently conveying the address and data included in said parallel command from said host controller to said memory controller.

13. The apparatus in accordance with claim 12 wherein said parallel bus is connected to a plurality of said signal ports.

14. The apparatus in accordance with claim 12 further comprising a serial bus for serially conveying the address and data included in said serial command from said host controller to said memory controller.

15. An apparatus for selectively routing signals between signal ports in response to a command from a host controller, said command including an address and data, the apparatus comprising:

a plurality of switch cell arrays, each comprising a plurality of switch cells, each switch cell receiving an input control signal and providing a signal path between a separate pair of said signal ports in response to assertion of said input control signals;

a plurality of memory cells, each memory cell storing data and selectively asserting or deasserting the control signal input to at least one of the switch cells in each of said switch cell arrays according to the stored data; and memory controller means receiving said command from said host controller for writing data included in the command into each memory cell of a particular subset of said memory cells upon receipt of the command, wherein the address included in said command indicates the particular subset of memory cells, and wherein a number of memory cells included in the particular subset is a variable function of the address.

16. The apparatus in accordance with claim 15 further comprising a parallel bus for concurrently conveying the address and data included in said command from said host controller to said memory controller.

17. The apparatus in accordance with claim 16 wherein said parallel bus is connected to a plurality of said signal ports.

18. The apparatus in accordance with claim 16 further comprising a serial bus for serially conveying the address and data included in said serial command from said host controller to said memory controller.

* * * * *